United States Patent
Bower, III et al.

(10) Patent No.: US 10,530,643 B2
(45) Date of Patent: Jan. 7, 2020

(54) AUTOMATIC MANAGEMENT NETWORK PROVISIONING

(71) Applicant: Lenovo Enterprise Solutions (Singapore) Pte. Ltd., Singapore (SG)

(72) Inventors: Fred Allison Bower, III, Durham, NC (US); Caihong Zhang, Shanghai (CN)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 259 days.

(21) Appl. No.: 15/373,885

(22) Filed: Dec. 9, 2016

(65) Prior Publication Data

US 2018/0167271 A1 Jun. 14, 2018

(51) Int. Cl.
*H04L 12/24* (2006.01)
*H04L 29/12* (2006.01)
*H04L 12/18* (2006.01)

(52) U.S. Cl.
CPC ...... *H04L 41/0806* (2013.01); *H04L 41/0886* (2013.01); *H04L 61/2007* (2013.01); *H04L 12/18* (2013.01)

(58) Field of Classification Search
None
See application file for complete search history.

(56) References Cited

U.S. PATENT DOCUMENTS

| | | | | |
|---|---|---|---|---|
| 2005/0198629 A1* | 9/2005 | Vishwanath | ............. | G06F 8/61 717/174 |
| 2008/0229089 A1* | 9/2008 | Assouad | ............. | H04L 41/085 713/2 |
| 2011/0103391 A1* | 5/2011 | Davis | ............. | H04L 45/60 370/400 |
| 2017/0257272 A1* | 9/2017 | Bauer | ............. | H04L 67/18 |

* cited by examiner

*Primary Examiner* — Saumit Shah

(57) ABSTRACT

According to one embodiment, a method for automatic management network provisioning includes: broadcasting a provisioning request to one or more devices; receiving at least one provisioning reply from the device(s); and broadcasting a provisioning configuration packet to device(s) from which a provisioning reply was received. In another embodiment, a method for peer-based automatic management network provisioning includes broadcasting network configuration information corresponding to a particular device to one or more other devices of a network environment; determining, after the broadcast, whether such network configuration information was modified; and requesting, from one or more of the other devices, the network configuration information corresponding to the particular device. The request is made in response to determining the particular device network configuration information was modified after broadcasting the network configuration information to the one or more other devices. Corresponding systems and computer program products are also disclosed.

25 Claims, 4 Drawing Sheets

AUTOMATIC MANAGEMENT NETWORK PROVISIONING

FIELD OF THE INVENTION

The present invention relates to network provisioning, and more particularly to automatically managing provision of network resources in a secure manner for devices added to a network and requiring network connectivity.

BACKGROUND

In existing network environments, each device connected to the network (whether physical or virtual) must generally be configured by assigning identifying information to the device. Assigning identifying information such as an Internet protocol (IP) address, Media Access Control (MAC) address, etc. enables proper functioning of the device within the network environment. As such, addition of new devices to the network, and/or reconnection of existing devices (such as devices which were part of the network but reset to a prior or default configuration/settings and thus no longer properly connected to the network environment) requires the management of provisioning network resources to the newly added/reconnected device(s).

Typically, the identifying information may be manually assigned (e.g. by an administrator of the network environment). This presents a beginning of time problem for three distinct circumstances. First, when a new system is placed into the data center, it comes with a set of factory-assigned defaults which will prevent it from communicating until it has been configured with a direct connection. Second, when a system is reset to factory defaults in response to a corrupted configuration or as part of diagnosing a problem, settings are lost and must be re-established, again with a direct connection. Finally, when the part(s) that contain the network configuration data are replaced, manual configuration with a direct connection is required to re-establish network connectivity.

One conventional approach to address the foregoing problems with static address assignment is to use Dynamic Host Configuration Protocol (DHCP). However, skilled artisans in the field of network provisioning will appreciate that DHCP undesirably presents security vulnerabilities, which many data center administrators wish to avoid. Additionally, basic DHCP operation assigns addresses from a pool, thus requiring an administrator to consult the DHCP logs to determine which address was assigned to a specific server. To counter this problem, DHCP static assignment can assign a fixed IP address for a specific machine, but this requires the administrator to assign the address with the machine's media access control (MAC) address information, which may not be known at the time of provisioning. As such, the fixed IP approach within DHCP requires the administrator to discover and add the device MAC address to the DIRT static list. This is a cumbersome process which requires a priori knowledge regarding the device to be added and configuration of the network, each of which add undesirable burden to the overall process of network provisioning management.

Another conventional technique employed to address problems with static network provisioning such as described above utilizes Internet Protocol, Version 6 (IPv6) Link-Local Addressing (LLA). IPv6 LLA automatically provisions a unique address based upon the MAC address of the device to be added to the network environment. Additional addresses can be configured with a connection on the LLA A address. However, since LLA addresses are not mutable in IPv6 protocol rules, the network administrator must utilize a machine already connected to the local subnet of the system being configured in order to accomplish provisioning.

Another alternative approach for network provisioning utilizes a default addressing, scheme for hardware that is controlled from the network infrastructure. For example, an event may be raised when a new MAC address is detected on a switch port connection, triggering assignment of network configuration settings based upon data center allocations from the physical location of the switch port. This technique is typically used in cluster-based network environments where the hardware is substantially homogeneous, but is much more difficult to administer in other more general network environments such as data centers, where the connected hardware is heterogeneous and may thus have multiple MACs per switch port. As a result, the administrator typically must be closely engaged in the process of network provisioning in order to ensure the various heterogeneous hardware components are properly configured and provisioned for network connectivity.

Accordingly, in view of the limitations of existing techniques for managing network provisioning and particularly the security vulnerabilities and involvement of manual effort to accomplish network provisioning, it would be of great utility to provide systems, techniques, and computer program products enabling automatic provisioning of network configuration information in a secure manner, without requiring the use of a separate machine tied to a local subnet of the device to be provisioned within the network.

SUMMARY

In one embodiment, a computer-implemented method for automatic management network provisioning includes: broadcasting a provisioning request to one or more devices of a network environment; receiving at least one provisioning reply from at least one of the one or more devices; and broadcasting a provisioning configuration packet to at least the device(s) from which the at least one provisioning reply was received.

According to another embodiment, an automatic management network provisioning system includes a management server having a processor and logic integrated with and/or executable by the processor. The logic is configured to cause the management server to perform a computer-implemented method for automatic management network provisioning. The method includes: broadcasting a provisioning request to one or more devices of a network environment; receiving at least one provisioning reply from at least one of the one or more devices; and broadcasting a provisioning configuration packet to at least the device(s) from which the at least one provisioning reply was received. Each of the broadcasting the provisioning request, the receiving the at least one provisioning reply, and the broadcasting the provisioning configuration packet are performed by the management server.

In yet another embodiment, a computer program product includes a computer readable medium having stored thereon computer readable program instructions executable by an automatic management network provisioning server to cause the server to perform a method. The method includes: broadcasting a provisioning request to one or more devices of a network environment; receiving at least one provisioning reply from at least one of the one or more devices; and broadcasting a provisioning configuration packet to each device from which one of the provisioning replies was received.

According to more embodiments, a computer-implemented method for peer-based automatic management network provisioning includes: broadcasting network configuration information to one or more other devices of a network environment, the network configuration information corresponding to a particular device of the network environment; determining, after broadcasting to the one or more other devices the network configuration information corresponding to the particular device, whether the network configuration information corresponding to the particular device was modified; and requesting, from one or more of the other devices of the network, the network configuration information corresponding to the particular device, in response to determining the particular device network configuration information was modified after broadcasting the network configuration information corresponding to the particular device to the one or more other devices.

In still more embodiments, a peer-based automatic management network provisioning system includes a plurality of devices communicatively coupled via a network environment. At least one of the devices includes a processor and logic integrated with and/or executable by the processor to cause the device to perform a method. The method includes broadcasting network configuration information to one or more other devices of a network environment, the network configuration information corresponding to a particular device of the network environment; determining, after broadcasting to the one or more other devices the network configuration information corresponding to the particular device, whether the network configuration information corresponding to the particular device was modified; and requesting, from one or more of the other devices of the network, the network configuration information corresponding to the particular device, in response to determining the particular device network configuration information was modified after broadcasting the network configuration information corresponding to the particular device to the one or more other devices. Each of broadcasting the network configuration information, determining whether the network configuration information was modified, and requesting the network configuration information are performed by the at least one of the devices.

According to another embodiment, a computer program product for peer-based automatic management network provisioning includes a computer readable medium having stored thereon computer readable program instructions executable by one or more of a plurality of devices communicatively coupled via a network environment to cause the one or more devices to perform a method. The method includes: broadcasting network configuration information to one or more other devices of the network environment, the network configuration information corresponding to a particular device of the network environment; determining, after broadcasting to the one or more other devices the network configuration information corresponding to the particular device, whether the network configuration information corresponding to the particular device was modified; and requesting, from one or more of the other devices of the network, the network configuration information corresponding to the particular device in response to determining the particular device network configuration information was modified after broadcasting the network configuration information corresponding to the particular device to the one or more other devices.

Other aspects, features, and embodiments of the presently disclosed inventive concepts will be appreciated from reviewing the following detailed descriptions, figures, and claims in full detail. The descriptions and figures are provide for illustrative purposes and should be understood as not limiting on the scope of the inventive concepts disclosed herein.

DETAILED DESCRIPTION

Figure 1:
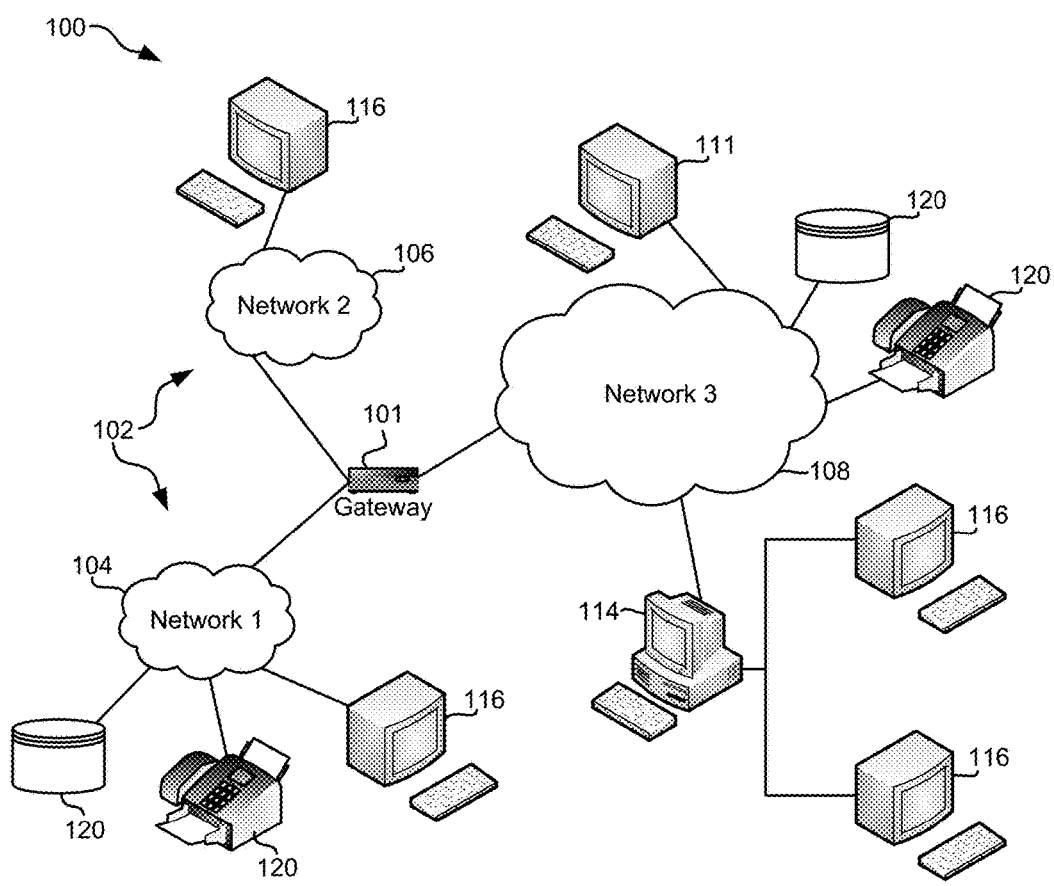
FIG. 1 illustrates a network architecture, in accordance with one possible embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Generally, the presently disclosed inventive concepts relate to provisioning and management of provisioning resources within a network environment. More particularly, the instant descriptions set forth systems, techniques, and computer program products for automatically managing network provisioning across a network environment, and addressing the need to provide identifying information to newly added and/or default-configured devices connected to, or seeking connection to, the network environment.

In one general embodiment, a computer-implemented method for automatic management network provisioning includes: broadcasting a provisioning request to one or more devices of a network environment; receiving at least one provisioning reply from at least one of the one or more devices; and broadcasting a provisioning configuration packet to at least the device(s) from which the at least one provisioning reply was received.

According to another general embodiment, an automatic management network provisioning system includes a management server having a processor and logic integrated with and/or executable by the processor. The logic is configured to cause the management server to perform a computer-implemented method for automatic management network provisioning. The method includes: broadcasting a provisioning request to one or more devices of a network environment; receiving at least one provisioning reply from at least one of the one or more devices; and broadcasting a provisioning configuration packet to at least the device(s) from which the at least one provisioning reply was received. Each of the broadcasting the provisioning request, the receiving the at least one provisioning reply, and the broadcasting the provisioning configuration packet are performed by the management server.

In yet another general embodiment, a computer program product includes a computer readable medium having stored thereon computer readable program instructions executable by an automatic management network provisioning server to cause the server to perform a method. The method includes: broadcasting a provisioning request to one or more devices of a network environment; receiving at least one provisioning reply from at least one of the one or more devices; and broadcasting a provisioning configuration packet to each device from which one of the provisioning replies was received.

According to another general embodiment, a computer-implemented method for peer-based automatic management network provisioning includes: broadcasting network configuration information to one or more other devices of a network environment, the network configuration information corresponding to a particular device of the network environment; determining, after broadcasting to the one or more other devices the network configuration information corresponding to the particular device, whether the network configuration information corresponding to the particular device was modified; and requesting, from one or more of the other devices of the network, the network configuration information corresponding to the particular device, in response to determining the particular device network configuration information was modified after broadcasting the network configuration information corresponding to the particular device to the one or more other devices.

In further general embodiments, a peer-based automatic management network provisioning system includes a plurality of devices communicatively coupled via a network environment. At least one of the devices includes a processor and logic integrated with and/or executable by the processor to cause the device to perform a method. The method includes broadcasting network configuration information to one or more other devices of a network environment, the network configuration information corresponding to a particular device of the network environment; determining, after broadcasting to the one or more other devices the network configuration information corresponding to the particular device, whether the network configuration information corresponding to the particular device was modified; and requesting, from one or more of the other devices of the network, the network configuration information corresponding to the particular device, in response to determining the particular device network configuration information was modified after broadcasting the network configuration information corresponding to the particular device to the one or more other devices. Each of broadcasting the network configuration information, determining whether the network configuration information was modified, and requesting the network configuration information are performed by the at least one of the devices.

According to another general embodiment, a computer program product for peer-based automatic management network provisioning includes a computer readable medium having stored thereon computer readable program instructions executable by one or more of a plurality of devices communicatively coupled via a network environment to cause the one or more devices to perform a method. The method includes: broadcasting network configuration information to one or more other devices of the network environment, the network configuration information corresponding to a particular device of the network environment; determining, after broadcasting to the one or more other devices the network configuration information corresponding to the particular device, whether the network configuration information corresponding to the particular device was modified; and requesting, from one or more of the other devices of the network, the network configuration information corresponding to the particular device in response to determining the particular device network configuration information was modified after broadcasting the network configuration information corresponding to the particular device to the one or more other devices.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such as hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

FIG. 1 illustrates an architecture 100, in accordance with one embodiment. As an option, the present architecture 100 may be implemented in conjunction with features from any other embodiment listed herein, such as those described with reference to the other FIGS. Of course, however, such architecture 100 and others presented herein may be used in various applications and/or in permutations which may or may not be specifically described in the illustrative embodiments listed herein. Further, the architecture 100 presented herein may be used in any desired environment.

As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 2:
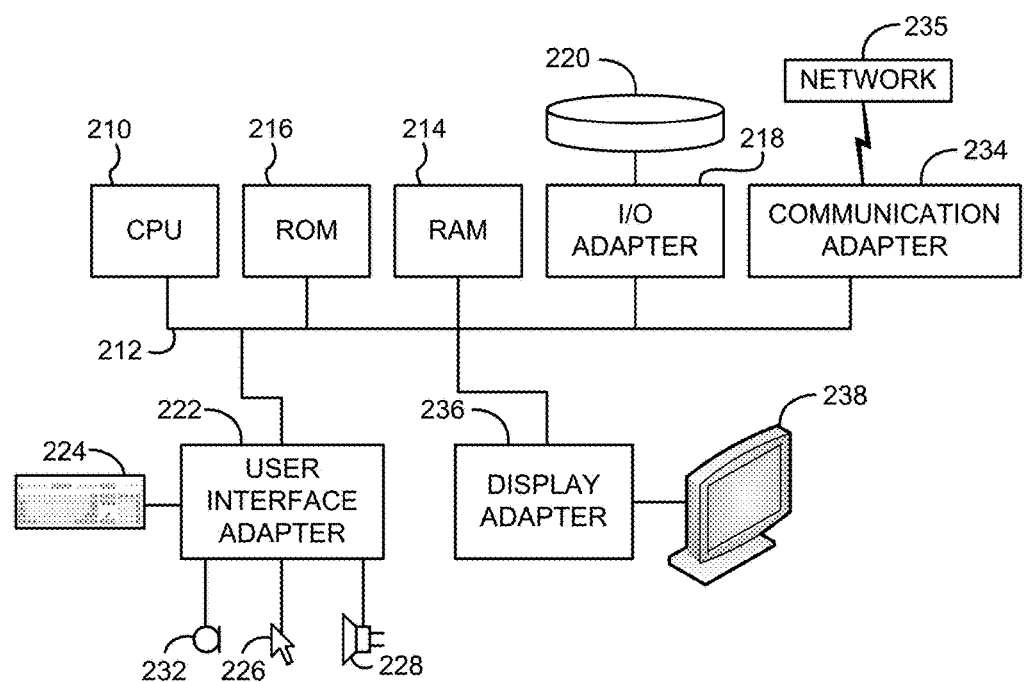
FIG. 2 illustrates an exemplary system, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), an FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, an FPGA, a central processing unit (CPU), an integrated circuit (IC), a graphics processing unit (GPU), etc.

Figure 3A:
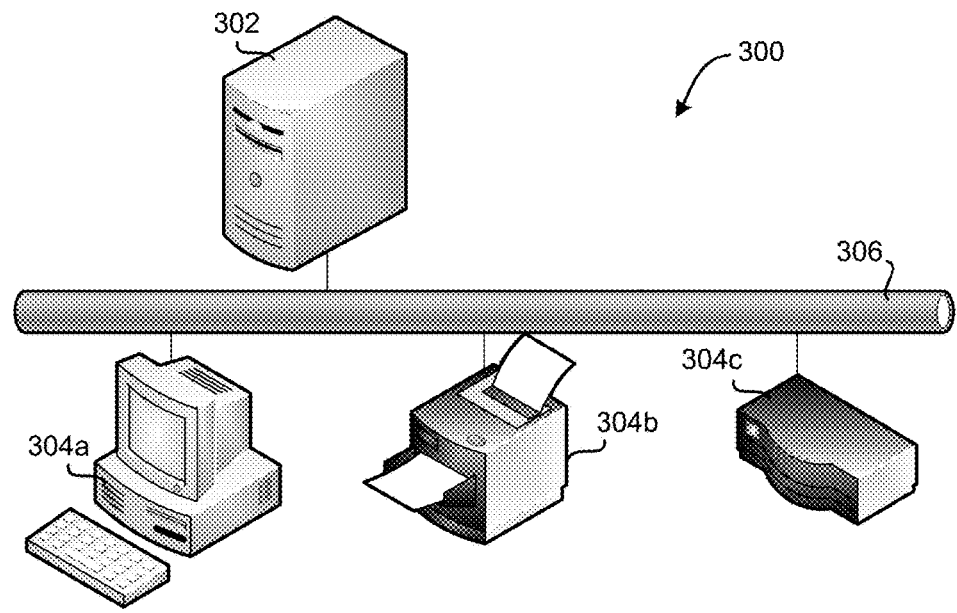
FIGS. 3A-3B illustrate exemplary network environments within which automatic management network provisioning may be performed, according to two exemplary embodiments.
Figure 3B:
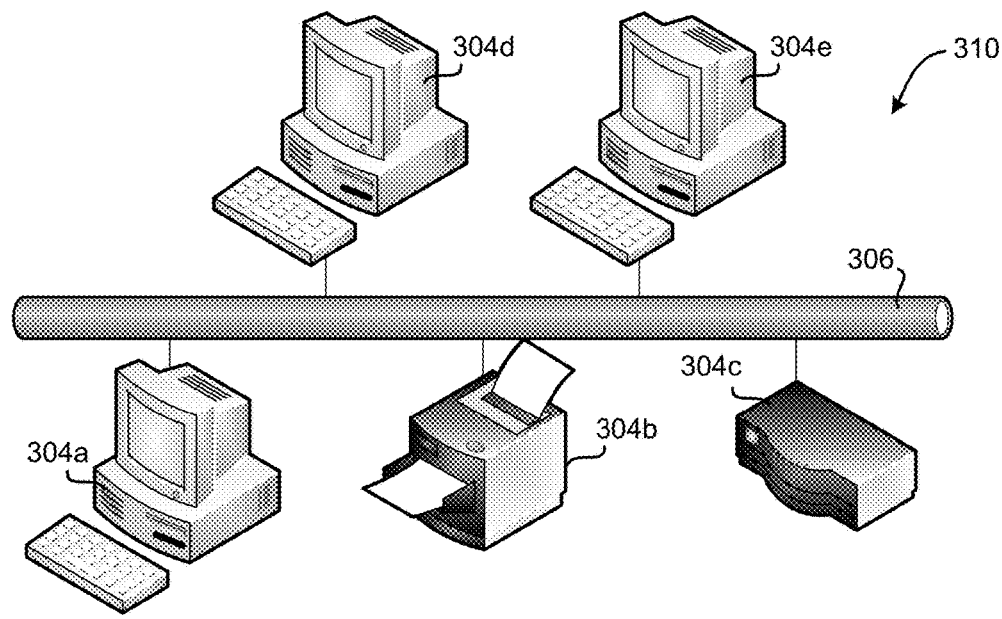

Turning now to FIGS. 3A-3B, two exemplary network environments 300, 310 are depicted to illustrate operation of the presently disclosed inventive techniques according to related but different embodiments of the invention. More specifically, the exemplary network environment 300 includes an automatic management network provisioning server 302 connected to a plurality of devices 304a-304c via an appropriate network connection 306 such as an Ethernet, WLAN, or any other suitable form of network connection/technique as would be appreciated by a person having ordinary skill in the art upon reading the present descriptions.

Exemplary network environment 310, on the other hand, includes a plurality of devices 304a-304e connected via an appropriate network connection 306. Optionally, in some approaches one of the devices 304a-304e may be an automatic management network provisioning server such as shown in FIG. 3A, but preferably an automatic management network provisioning server or equivalent device is unnecessary to accomplish automatic management network provisioning within the network environment 310.

Each of the network environments 300, 310 are suitable for automatic management network provisioning according to the presently disclosed inventive concepts. In various approaches, different techniques may be utilized to accomplish the desired automatic management network provisioning. These different techniques will be described in further detail below with reference to FIGS. 3A-3B and 4-5, in accordance with two exemplary embodiments. It should be understood that the exemplary embodiments represented in FIGS. 3A-3B and 4-5 may be employed in combination to facilitate automatic management network provisioning in different network environments and according to various applications without departing from the scope of the present disclosures.

In general, the presently disclosed inventive concepts facilitate and accomplish automatic management network provisioning based on extending existing techniques established for remote power control of servers on a network to also accomplish network provisioning in an automated, secure manner. Advantageously, the techniques described herein accomplish automatic management network provisioning without requiring the use of a separate machine connected to a local subnet of the device to be added/configured to operate within the network environment.

In one preferred embodiment, this functionality may be conveyed via modifying operation of Wake On LAN (WOL) or Wake On Wireless LAN (WOWLAN) techniques and packets for network provisioning purposes, as described in further detail below.

Conventional WOL and WOWLAN utilizes a special packet format, called a "magic packet," to activate supported hardware when the hardware is in a low-power state. In brief, a conventional magic packet includes instructions, typically in the packet header, which cause the device receiving the magic packet to activate in a full-power state in response to receiving the magic packet. It should be appreciated that other packets, data structures, functions, protocols, etc. which would be understood as equivalent to a magic packet may be similarly employed in the context of the present invention without departing from the scope of the present disclosure. In particular, "magic packets" as referenced herein may, but need not, include instructions to activate the receiving device in a full-power state, and preferably include instructions configured to cause the receiving device to activate and operate as an address provisioning state machine and/or participate in address provisioning as described in further detail herein.

The essential feature of packets, or other data structures, functions, protocols, etc. utilized to accomplish automatic management network provisioning in accordance with the inventive concepts described herein is an ability to be recognized, parsed, and any instructions therein relating to address provisioning followed by the receiving device. Notably, even if the receiving device is in a low-power state, or a default and/or unconfigured state with respect to network configuration settings (e.g. IP address, port, communication protocol, etc.), or otherwise not connected to the network environment due to missing and/or incorrect configuration information, the device receiving the network provisioning packet described herein engages in address provisioning in response to receiving the packet.

As such, preferred embodiments of the presently disclosed inventive concepts involve utilizing communications such as packets having a magic packet style header, but an otherwise non-WOL compliant packet format, as a signal to a server or other device of a network environment that effectively turns the network adapter firmware of the server/device into a provisioning state machine. Embodiments which use a magic packet header but an otherwise non-compliant packet format advantageously allows implementation of the presently disclosed inventive concepts without interfering with incompatible hardware which may be present in a given network environment. This allows embodiments of the invention to be retrofitted into environments with equipment that supports WOL without causing the WOL-compatible devices to inadvertently power on when in use. For instance, this magic packet style header is accepted by any network interface controller (NIC) PHY device that supports WOL without any other configuration required, advantageously providing a configuration-free interface operable to establish the full configuration on the network.

In general approaches following the presently disclosed inventive concepts, a magic packet or other similar data structure, function, protocol, etc. may be utilized to advertise an address distributing system to the network. The address distributing system may be advertised in any suitable manner, and preferably is advertised based on a management server broadcasting information indicating the address distributing system is available. For instance, the management server may broadcast a request for appropriate devices of a network environment to participate in the address distributing system. One exemplary embodiment in accordance with the foregoing general approach is described further below with reference to FIGS. 3A and 4.

Other general approaches may advertise the address distributing system based on devices of a network environment (optionally including a management server) periodically broadcasting network configuration information to other devices of the network, and subsequently requesting network configuration information. Such approaches are particularly advantageous, e.g., in the event of the requesting device being repaired, reset, or otherwise having network configuration information modified, set to a default value, etc. as will be appreciated by persons having ordinary skill in the art upon reading the present descriptions.

These other general approaches may be considered "peer-based" automatic management network provisioning, in the sense that no management server is necessary and network configuration information may be exchanged automatically between the various devices of the network environment. One exemplary embodiment of such other general approaches is described in greater detail below with reference to FIGS. 3B and 5.

Of course, the various general approaches, and specific implementations and variations thereof, may be employed in any combination, permutation, synthesis, or arrangement of the inventive concepts described herein without departing from the scope of the present invention.

Server-Based Automated Management Network Provisioning

For instance, in one embodiment a management server-based approach may be utilized as a primary or preferred automatic management network provisioning solution, while the peer-based approach may be utilized as a fallback technique for automatic management network provisioning, e.g. in event of the server failing. In other embodiments, server-based approaches may be implemented for devices being newly added to a network environment, while peer-based approaches may be utilized for devices within a network environment that require configuration following repair and/or reset of the respective devices. Similar combinations and/or variations of the foregoing schemes may also be employed.

Returning now to server-based techniques, in preferred approaches automatic management network provisioning involves a management server broadcasting a request to devices of the network environment indicating or requesting that devices participate in the address distributing system under appropriate conditions. For instance, devices having a default value or unassigned value for one or more pertinent network configuration parameters may be considered appropriate candidates for participating in the address distributing system.

As such, the management server may broadcast the request as a magic packet, such magic packet identifying the management server and including an indication of the condition(s) under which devices should participate in the address distributing system. For instance, a management server may broadcast a magic packet uniquely identifying the management server (e.g. via the management server MAC address or other equivalent unique identifier of a particular device) and a request or instruction that devices having a default value assigned to a particular network configuration parameter (e.g. IP address) participate in the address distributing system.

In response to receiving the magic packet, devices satisfying the condition(s) specified by the management server, e.g. default IP address assignments, may respond to the request. The response is preferably in the form of a second magic packet specifying information uniquely identifying the device satisfying the condition(s). e.g. the MAC address of the device. Magic packet formatting is a preferred form of transmitting requests, replies, and other communications configured to facilitate automatic management network provisioning since such packets include instructions recognizable by the receiving device and configured to cause the receiving device to respond in an appropriate manner, e.g. in this case by participating in automated management network provisioning as described herein.

Accordingly, the presently disclosed inventive concepts may include transmitting and/or receiving packets having a magic packet style header (e.g. a header comprising a sequence of bits unique to WOL magic packets that hardware is capable of recognizing even when in a standby/low power state), to enable network configuration by providing appropriate network configuration information in the payload of the magic packet, in several embodiments.

In response to receiving the second magic packet, e.g. at a management server or peer device within the network environment, a third magic packet message may be distributed to one or more, and preferably all, of the device(s) that broadcast the second magic packet. A single third magic packet may be distributed to all devices that sent the second magic packet, or all devices of the network environment, in one embodiment. In accordance with such approaches, the single third magic packet preferably includes all appropriate network configuration information required by the various devices that sent the second magic packet. Furthermore, the individual devices are preferably configured to parse the network configuration information in the third magic packet and identify the particular network configuration information that is appropriate for the particular device. Accordingly, in particularly preferred approaches where network configuration information corresponding to multiple different devices is included in a single third magic packet, the network configuration information for each of the multiple different devices is associated with a unique identifier corresponding to the particular device to which the network configuration information corresponds.

For instance, network configuration information may be associated with a MAC address of the particular device to which the network configuration information corresponds. Each device may therefore identify the appropriate network configuration information within the third magic packet based on detecting the unique identifier associated therewith.

In additional and/or alternative embodiments, different third magic packets may be distributed to each of the devices, each third magic packet preferably including any requisite provisioning configuration information for the individual device to which the respective third magic packet is distributed, e.g. IP address, port, communication protocol, etc. as would be understood by a person having ordinary skill in the art upon reading the present disclosures.

In a particularly preferred approach, each third magic packet includes the target device's MAC address and the network address to be assigned to the target device, e.g. an IP address to configure the IP of the target machine.

In accordance with one embodiment, the presently disclosed inventive systems, techniques, and computer program products for automated management of network provisioning may be implemented in a network environment including a management server configured to manage network provisioning within the network environment. One illustrative embodiment of such a network environment is shown in FIG. 3A, and includes management server 302 communicatively coupled to devices 304a-304c via a suitable network connection 306. The devices of the network environment 300 may include any suitable type, combination, permutation, etc. of network-enabled devices, such as servers; data storage devices; networking devices such as switches, routers, etc.; processing clusters; workstations; printers and/or multifunction peripherals, etc. as would be understood by a person having ordinary skill in the art upon reading the present descriptions.

Figure 4:
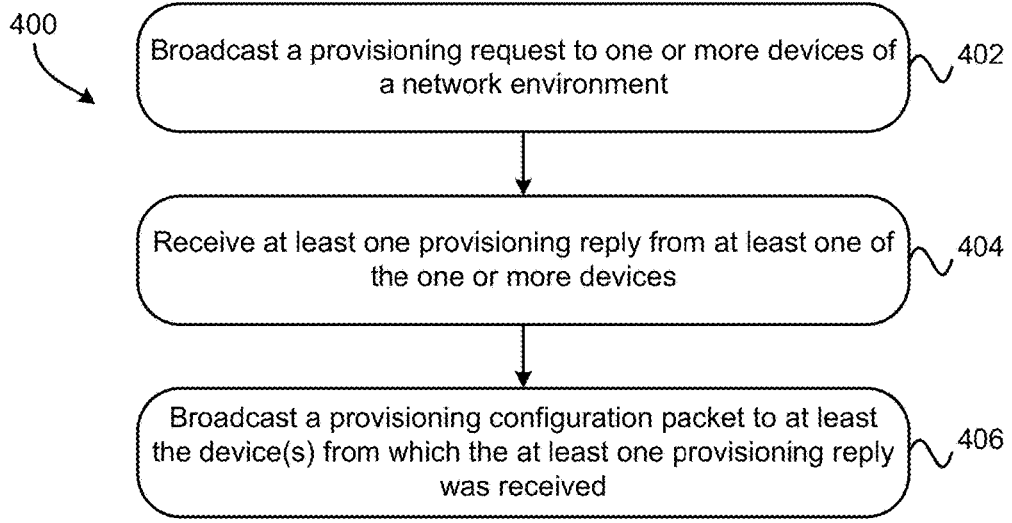
FIG. 4 is a flowchart of a method for automatic management network provisioning, according to one embodiment.

Now referring to FIG. 4, a flowchart of a method 400 is shown according to one embodiment. The method 400 may be performed in accordance with the present invention in any of the environments depicted in FIGS. 1-3B, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by an automatic management network provisioning server, e.g. server 302 as shown in FIG. 3A, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a provisioning request is broadcast to one or more devices, e.g. devices 304a-304c, of a network environment, e.g. network environment 300. The provisioning request is preferably broadcast by a management server, e.g. management server 302 of FIG. 3A, and according to various embodiments the provisioning request may be broadcast according to a predetermined interval, schedule, etc. and/or in response to detecting a predetermined trigger event, such as a new device being connected to the network environment, a device being repaired or reset, a device network configuration parameter value being set to a default value, etc. as would be understood by a person having ordinary skill in the art upon reading the present descriptions.

Moreover, in further embodiments the provisioning request may include identifying information corresponding to the management server of the network environment. For instance, the provisioning request may include, e.g., a machine type; a serial number; location information such as a physical location of the management server and/or identifying network(s) (physical and/or virtual) with which the management server is connected; a MAC address, and/or other suitable identifying information corresponding to the management server, in any combination that would be appreciated by a skilled artisan upon reading the present disclosure. In particularly preferred approaches, the identifying information uniquely identifies the management server within the network environment for which the management server provides address provisioning services.

In additional and/or alternative approaches, the provisioning request optionally includes an instruction configured to cause each of the one or more devices of the network environment exhibiting a default network configuration parameter to broadcast a provisioning reply. The default network configuration parameter preferably includes a default IP address.

In some aspects the provisioning request may exclude an affirmative instruction configured to cause the device(s) exhibiting default parameters to respond by broadcasting a provisioning reply. In such aspects the individual devices are configured to parse the received provisioning request and automatically reply in response to determining a reply is appropriate, e.g. in response to the device determining the network configuration parameter for the device matches condition(s) specified in the provisioning request, such as the device exhibiting a default value for the network configuration parameter. Further still, the device may be configured to reply in response to determining a reply is appropriate based on the device not having a functional connection with the network environment.

Accordingly, and with continuing reference to FIG. 4, method 400 includes operation 404, in which at least one provisioning reply is received from at least one of the devices communicatively coupled to the management server via the network environment. As noted above, the provisioning reply or replies are preferably received by the management server, and are broadcast or sent directly to the management server in response to either the instruction included in the provisioning request, a determination that a reply is appropriate as described above, or some combination thereof, in various embodiments.

In some approaches, each provisioning reply received by the management server may include an indication that the device from which the provisioning reply was received exhibits a default network configuration parameter, as well as identifying information corresponding to the device exhibiting the default network configuration parameter. In a manner similar to the identifying information provided with the provisioning request, the identifying information included in the provisioning replies is preferably information that identifies the individual device(s) issuing a response to the specific provisioning request, and more preferably uniquely identifies such devices. Accordingly, the provisioning reply may include identifying information such as device serial numbers, types, MAC addresses, location information, etc. as described herein and equivalents thereof that would be appreciated by a person having ordinary skill in the art upon reading the present descriptions.

In addition, and again according to preferred approaches, the default network configuration parameter for which the devices of the network environment are queried via the provisioning request includes a default IP address. Skilled artisans will appreciate, however, that other network configuration parameters may be queried and serve as the basis for participation in an address provisioning scheme or system without departing from the scope of the present disclosure. Other equivalent or suitable network configuration parameters may also be utilized in other embodiments, such as type of communication and/or address protocol (e.g. IPv4, IPv6, etc.), port, device name, path, domain name service (DNS) parameters, etc. as would be appreciated by a person having ordinary skill in the art upon reading the present descriptions.

Referring again to FIG. 4, method 400 also includes operation 406, where a provisioning configuration packet is broadcast to at least the device(s) from which a provisioning reply was received. The provisioning configuration packet may be broadcast across the network environment to all devices, or targeted to specific devices that broadcast a provisioning reply, in various approaches. For instance, a provisioning configuration packet may be broadcast across the network, and individual machines may be responsible for determining whether the packet applies to the individual machine and take appropriate action, such as either setting a network configuration parameter to a value specified for the individual machine by the provisioning configuration packet, or ignoring the packet if no value is specified therein for the individual machine. Additionally and/or alternatively, a provisioning configuration packet may be transmitted directly to the individual machine(s) from which a provisioning reply was received.

Accordingly, in one embodiment provisioning configuration packets may include unique value(s) of one or more network configuration parameters, such as a plurality of unique IP addresses, ports, communication protocols, etc. to be used by individual devices of the network environment. Optionally, network configuration packets may include affirmative instructions for individual devices to assign particular ones of the unique values as the network configuration parameter for the individual devices from which the provisioning reply or replies were received.

Put another way, provisioning configuration packets preferably include unique values for one or more network configuration parameters. The unique values are included in the packet in a manner such that the values are identifiable with respect to a particular device to which the values should be applied to accomplish network provisioning. As such, in one embodiment provisioning configuration packets include a plurality of unique values, and each value or set of values that are to be applied to a particular device within the network environment are associated with another unique value that uniquely identifies the particular device (e.g. serial number, MAC address, etc. as described above).

Preferably, the network configuration parameter or parameters for which unique values are included in the provisioning configuration packet(s) include an IP address.

In various embodiments, each different one of the unique values (or alternatively different individual sets of the unique values) for the network configuration parameter(s) may be assigned to different devices from which the provisioning replies were received. For instance, the provisioning configuration packet may include an instruction to assign particular network configuration parameter unique values to different devices based on other unique values uniquely identifying the different devices and which are stored in association with the particular unique values for the network configuration parameters. In other approaches the individual devices may parse the provisioning configuration packet and assign the appropriate network configuration parameter values for each particular device based on information included in the provisioning configuration packet, e.g. based on detecting a unique value that corresponds to, belongs to, or otherwise identifies the particular device.

In some embodiments, it is advantageous to perform a validation procedure following assignment of network configuration information to device(s) of the network environment. For instance, in response to assigning a particular unique value to a particular parameter (e.g. IP address, DNS domain, port, etc.) the device to which the value was assigned may broadcast a packet to the network environment, the packet designating the newly assigned value, optionally in combination with any other suitable network configuration information, and preferably in association with information uniquely identifying the device to which the value was assigned.

Other devices of the network environment, preferably a management server, may receive the packet and compare the newly assigned value to a previously stored record to determine whether the newly assigned value for the device matches the value assigned to the device according to the previously stored record. For example, the previously stored record may be a record created by the management server in response to receiving a packet specifying network information for the device prior to the device being configured with the newly assigned value. In another example, upon broadcasting configuration information to a device, e.g. in a provisioning configuration packet, the management server may create a record of the configuration information broadcast to the device and subsequently compare configuration information received from the device against the configuration information previously sent to the device.

Accordingly, unique network configuration parameter values may be assigned to different devices within the network environment based on information identifying each different one of the devices from which the provisioning replies were received. The information identifying each different one of the devices from which the provisioning replies were received may be individually selected from a device serial number; a device type; and a device MAC address. As such, different identifying information may be included for different devices within a single provisioning configuration packet, in some embodiments.

In particularly preferred approaches, broadcasting the provisioning configuration packet to the device from which the provisioning reply was received in operation 406 is performed automatically, e.g. in response to receiving the provisioning reply from the device. In this manner, the presently disclosed inventive approaches for automatic management network provisioning obviate the need for user involvement in address provisioning and other network configuration necessary to discover and/or add devices to a network environment, e.g. in the case of repair, reset, or new devices being introduced to the network environment.

According to certain aspects of the inventive concepts presented herein, at least one of the provisioning request, the at least one provisioning reply, and the provisioning configuration packet are provided in the form of a packet having a magic packet style header. As noted above, magic packets referenced herein generally exhibit the format of a packet comprising a header having a specified bit pattern unique to WOL magic packets, and a payload comprising special instructions configured to cause a compatible device to automatically participate in network provisioning. In particularly preferred approaches, all packets exchanged for the purpose of network provisioning are packets having magic packet style headers as defined herein. Accordingly in one approach each of the provisioning request, the at least one provisioning reply, and the provisioning configuration packet are provided in the form of a packet having a magic packet style header.

As will be appreciated by a skilled artisan reading the present disclosures, the inventive techniques described herein may be provided in the form of a system and/or computer program product. Accordingly, in one approach a system configured to perform operations as discussed above with reference to FIG. 4 and method 400 may include an automatic management network provisioning system comprising a management server. The management server preferably includes a processor and logic integrated with and/or executable by the processor. The logic is configured to cause the management server to perform the computer-implemented method 400, such that each of broadcasting the provisioning request, receiving the at least one provisioning reply, and broadcasting the provisioning configuration packet are performed by the management server.

Referring again to FIGS. 3A and 4, one illustrative demonstration of automatic management network provisioning will be described. The illustrative process and devices involved therein are to be understood as exemplary, and are not intended to be limiting on the scope of the presently disclosed inventive concepts.

In one embodiment, a management server 302 of a network environment 300 may broadcast a provisioning request as a magic packet to one or more devices 304a-304c of the network environment 300. Assume for purposes of this example that devices 304a and 304b are fully configured and operational within the network environment, but device 304c was recently added to the network environment, or repaired/reset such that the device 304c exhibits a default IP address or other network configuration parameter. The provisioning request broadcast by the management server 302 includes an identifier of the management server 302, e.g. an indication that the management server MAC address has a value of 40:F2:E9:AF:0E:20. The provisioning request broadcast by the management server 302 also includes an indication that the management server 302 is seeking devices exhibiting a default network configuration parameter value, e.g. a default IP address. This indication may include a default value or set of default values against which devices may compare corresponding values set for the device, in one embodiment.

In response to receiving the provisioning request magic packet broadcast by the management server 302, devices 304a and 304b take no action, since these devices do not match the criterion stated in the provisioning request magic packet (default network configuration parameter). Device 304c, however, determines the criterion stated in the provisioning request magic packet is satisfied by a corresponding network configuration parameter of the device 304c (e.g. the IP address of the device 304c matches one of a set of default IP addresses stated in the provisioning request magic packet).

In response to this determination, device 304c broadcasts a provisioning reply magic packet, either directly to the management server 302 or generally across the network environment 300. The provisioning reply magic packet includes an indication that device 304c meets the criterion stated in the provisioning request magic packet, and also specifies one or more unique values that uniquely identify device 304c, e.g. the MAC address, serial number, location information, etc. of device 304c.

In response to receiving the provisioning reply magic packet, management server 302 generates and broadcasts a provisioning configuration magic packet. The provisioning configuration magic packet includes any network configuration information required by device 304c, such as an IP address, and an optional instruction for device 304c to assign the required network configuration parameter values to the corresponding values within the configuration file(s) for device 304c. Alternatively, if the provisioning configuration magic packet excludes the optional instruction, device 304c may automatically parse the provisioning configuration magic packet upon receipt thereof, and may determine whether and if so which values specified in the provisioning configuration magic packet apply to device 304c. For example, values may be determined to apply to device 304c based on detecting such values are associated with identifying information corresponding to the device 304c, preferably identifying information provided by the device 304c in the provisioning reply magic packet.

In response to determining the magic packet includes one or more values that apply to device 304c, and optionally in response to detecting the packet includes the optional assignment instruction, device 304c may assign the applicable values to corresponding network configuration parameters, e.g. IP address, port, communication protocol, etc. as would be understood by a person having ordinary skill in the art upon reading the present disclosure.

Management server 302 may determine the appropriate configuration parameter values for device 304c using any suitable technique, such as querying a table of available values for a particular network configuration parameter. Additionally and/or alternatively, the management server 302 may determine whether a particular value for a particular network configuration parameter was previously set for device 304c, e.g. by querying a table of values to locate values previously associated with device 304c based on such values being associated with identifying information specific to device 304c within the table.

Peer-Based Automated Management Network Provisioning

In more approaches, the inventive systems, techniques, and computer program products for automated management of network provisioning may be implemented in a network environment excluding any management server. In such approaches, the presently disclosed inventive concepts may be realized via a peer-to-peer type system of communication and network provisioning. Of course, skilled artisans will also appreciate that peer-based provisioning may be implemented in environments where a management server is present. For example, peer-based provisioning may be employed as a redundant or fallback mechanism for provisioning in the event of a management server failure.

In such implementations, which are particularly suitable for cases where a device is being repaired or otherwise has network configuration information such as network address reset to a default value, a device or devices may periodically broadcast configuration information to other "peer" systems within the network environment. Preferably such systems support a magic packet-based or other similarly embodied configuration process within the general framework set forth above. Upon repair or reset, the device can broadcast a request to initiate a transfer front a peer device with the configuration information, and thereby facilitate automatic management network provisioning. One illustrative example of the foregoing procedure for automatic management network provisioning is shown in FIG. 5 and described further below with particular reference to FIG. 3B.

Figure 5:
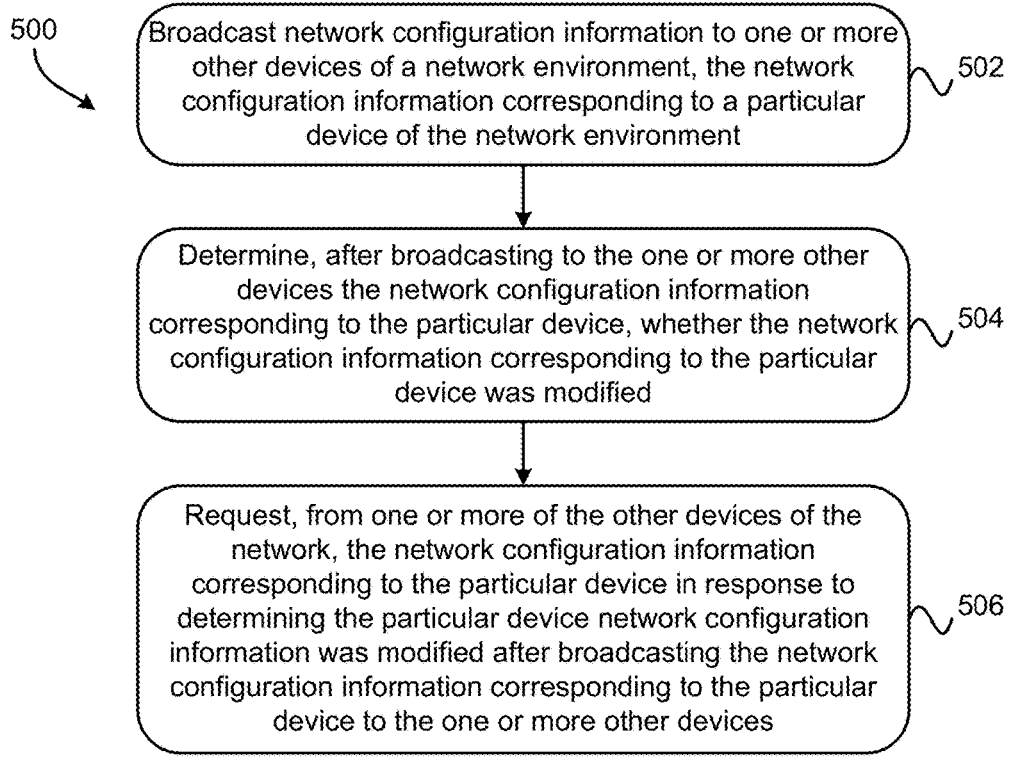
FIG. 5 is a flowchart of a method for automatic management network provisioning, according to one embodiment.

Now referring to FIG. 5, a flowchart of a method 500 is shown according to one embodiment. The method 500 may be performed in accordance with the present invention in any of the environments depicted in FIGS. 1-3B, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more devices of a network environment, e.g. devices 304a-304e of network environment 310 as shown in FIG. 3B, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where network configuration information is broadcast to one or more other devices of a network environment. The network configuration information corresponds to a particular device of the network environment, preferably the device that broadcast the network configuration information. As such, the broadcast may include network configuration information such as values for one or more network configuration parameters that are assigned to the particular device at the time of broadcast. The network configuration information may preferably be broadcast in association with information that uniquely identifies the device to which the network configuration information corresponds. For instance, in one embodiment the network configuration information and the information uniquely identifying the device to which such network configuration information corresponds are associated and broadcast as a payload of a packet characterized by a magic packet style header, e.g. a header comprising a sequence of bits unique to WOL magic packets that hardware recognizes even when in a low power/standby state.

The network configuration information may be periodically broadcast by individual devices of the network environment, e.g. according to a predetermined schedule, and/or may be broadcast in response to individual devices detecting a predetermined trigger condition, e.g. in response to the device receiving or setting a particular network configuration parameter value and which permits the device to participate in communications across the network environment. In one particularly preferred embodiment devices may broadcast IP addresses in response to an IP address other than a default IP address being assigned to the devices.

Preferably, devices receiving network configuration information may store such information, e.g. to a memory of the receiving device. Storing received network configuration information enables subsequent comparison of such information against requests for network configuration that may be subsequently received from other devices of the network environment, as will be described in further detail below. As such, in some approaches each device participating in the method 500 may maintain a data structure such as a lookup table in which network configuration information is stored in association with a unique identifier of the device to which the network configuration information corresponds. The data structure may include network configuration information for any one or more of the devices of the network environment.

Thus, operation 502 of method 500 represents a scenario in which automatic management network provisioning may be accomplished without the use of a specialized or dedicated management server 302 as included in the network environment 300 of FIG. 3A. Method 500 therefore provides automatic management network provisioning in a peer-to-peer fashion, which is particularly appropriate for network environments such as environment 310 shown in FIG. 3B.

Method 500 also includes operation 504, in which, at a point in time after broadcasting the network configuration information corresponding to the particular device to the one or more other devices of the network environment, whether the network configuration information corresponding to the particular device was modified since the network configuration information was broadcast. Modification of network configuration information may occur in any appropriate manner, and may be intentional or unintentional in various scenarios. Most commonly, in the context of the present disclosures network configuration information is modified in the course of repairing, resetting, or replacing devices and/or portions thereof. Furthermore, the network configuration information which is the particular focus of operation 504 includes an IP address in preferred approaches, although additional and/or alternative network configuration information described elsewhere herein may be included without departing from the scope of method 500.

Determining whether the particular device network configuration information was modified, in preferred embodiments, may include determining, after broadcasting the network configuration information corresponding to the particular device, whether the particular device network configuration information is set to a default value, particularly a default IP address.

With continuing reference to method 500 and FIG. 5, in operation 506 network configuration information corresponding to the particular device is requested from one or more of the other devices of the network. The request is made in response to determining the particular device network configuration information was modified after broadcasting the network configuration information corresponding to the particular device to the one or more other devices.

As such, it will be understood that operations 502-506 of method 500 may be performed by any one of the devices of the network environment, and in more approaches each device of a network environment which is configured to participate in automatic management network provisioning, e.g. configured to receive and interpret magic packets as defined herein, may perform operations 502-506 periodically and/or in response to detecting a predetermined trigger condition.

In more embodiments, to facilitate network provisioning, method 500 may include receiving, from one or more of the other devices of the network environment, the network configuration information corresponding to the particular device. For instance, in response to receiving the request from the particular device, one or more devices may consult a data structure including network configuration information previously received from other devices of the network and determine whether the data structure includes network configuration information corresponding to the device submitting the request in operation 506.

In response to determining the data structure includes such network configuration information, e.g. based on matching a unique identifier of a particular machine included in the request submitted in operation 506 with a unique identifier stored in association with network configuration information in the data structure, the device may respond to the request of operation 506 by providing the network configuration information stored in association with the unique identifier corresponding to the requesting device. Most preferably, both the request submitted in operation 506 and any replies provided in response thereto are in the form of magic packets, with the network configuration information being provided in the payload of the magic packet.

With continuing reference to method 500, and in response to receiving network configuration information from other devices of the network environment, the requesting device may assign some or all of the network configuration information received from the one or more of the other devices of the network to the requesting device. For instance, the requesting device may assign an IP address specified in the reply from the other devices as the requesting device IP address.

Of course, in various embodiments the network configuration information may include a plurality of network configuration parameter values. Such values may correspond to different network configuration parameters, or the same parameter, and furthermore various different values may correspond to different devices of the network environment.

In one approach, each network configuration parameter value is associated with a unique value identifying the device to which the value corresponds, which facilitates assigning the appropriate network configuration information to the appropriate device, e.g. based on the matching the unique value identifying the particular device to a unique value associated with the network configuration parameter in another device's data records. As noted above, each unique value may be selected from a device serial number; a device type; a device MAC address, a device name, or any other suitable unique identifier of the device within the context of the network environment.

In some embodiments, it is advantageous to perform a validation procedure following assignment of network configuration information to device(s) of the network environment. For instance, in response to assigning a particular unique value to a particular parameter (e.g. IP address, DNS domain, port, etc.) the device to which the value was assigned may broadcast a packet to the network environment, the packet designating the newly assigned value, optionally in combination with any other suitable network configuration information, and preferably in association with information uniquely identifying the device to which the value was assigned.

Other devices of the network environment, preferably peer devices as opposed to a management server, may receive the packet and compare the newly assigned value to a previously stored record to determine whether the newly assigned value for the device matches the value assigned to the device according to the previously stored record. For example, the previously stored record may be a record created in response to receiving a packet from the device prior to the device being configured with the newly assigned value.

Again, the presently disclosed inventive concepts may be embodied as methods, computer program products, and/or systems in various approaches. In one particular embodiment of a system configured to perform automatic management network provisioning as described above with respect to method 500 and FIG. 5, an automatic management network provisioning system includes a plurality of devices communicatively coupled via a network environment. For instance, a network environment 310 as shown in FIG. 3B including a plurality of devices 304a-304e communicatively coupled via an appropriate network connection 306 represents such an exemplary system, in one embodiment.

In such tangible systems, at least one of the devices preferably includes a processor and logic integrated with and/or executable by the processor to cause the device to perform the method 500. Accordingly, each of broadcasting the network configuration information in operation 502, determining whether the network configuration information was modified in operation 504, and requesting the network configuration information in operation 506 are performed by the at least one of the devices, preferably the same single device.

With continuing reference to FIG. 5 and method 500, one illustrative embodiment of automatic management network provisioning will be described in the context of a network environment 310 as shown in FIG. 3B. Those having ordinary skill in the art will appreciate that the illustrative embodiment is provided by way of example and is not to be construed as limiting on the scope of the inventive concepts presently disclosed.

As shown in FIG. 3B, network environment 310 includes devices 304a-304e communicatively coupled via the network connection 306. Notably, by way of contrast to network environment 300 as shown in FIG. 3A, none of the devices 304a-304e are configured to perform as a management server such as server 302 shown in FIG. 3A. Instead, the network environment 310 provides automatic management network provisioning in a peer-based approach such as described with reference to FIG. 5.

Accordingly, each of the devices 304a-304e may periodically broadcast, preferably in the form of a packet having a magic packet style header, the respective device's network configuration information to all other devices of the network environment 310. Assume for purposes of this example that device 304a broadcasts network configuration information set for device 304a to devices 304b-304e, device 304b broadcasts network configuration information set for device 304b to devices 304a and 304c-304e, etc. While simultaneous broadcasting is in no way necessary, assume for purposes of the exemplary embodiment presently described that all devices 304a-304e broadcast respective network configuration information at an arbitrary time point T=0, and that at T=0 all devices 304a-304e are properly configured for full participation in and communication via the network environment 310. As such, none of devices 304a-304e exhibit a default, missing, or incorrect network configuration parameter value at T=0.

Assume further that at some point in time following T=0, device 304c is repaired, reset, replaced, or otherwise caused to set or modify at least one network configuration parameter value to a default or improper value. For instance, device 304c may be reset and the IP address thereof set to a default IP address.

In response to the repair, reset, etc., e.g. as part of an initialization process of device 304c, the modification of the network configuration parameter value(s) is detected by device 304c. For instance, the device 304c may experience an inability to fully participate in or communicate via the network environment 310 and may optionally evaluate the IP address and/or other network configuration parameter value(s) designated for device 304c.

In response to the inability to participate and/or communicate, and/or in response to determining the evaluated network configuration parameter values are incorrect (e.g. missing or default), device 304c broadcasts a magic packet to devices 304a-304b and 304d-304e. The magic packet includes a payload specifying uniquely identifying information for device 304c, as well as a request that any appropriate network configuration parameter value(s) known to devices 304a-304b and/or 304d-304e be provided to device 304c.

In response to receiving the request magic packet from device 304c, devices 304a-304b and/or 304d-304e may each query network configuration information stored locally to the respective device and determine whether the stored network configuration information includes network configuration information corresponding to device 304c, e.g. based on detecting network configuration information stored in association with a unique device identifier that matches the unique identifying information provided by device 304c in the magic packet that included the request.

In response to determining one of the devices 304a-304b and/or 304d-304e does have local access to network configuration information for device 304c, the respective device may transmit such information as a payload of another magic packet, e.g. a reply magic packet. Upon receiving the reply magic packet, device 304c assigns the network configuration parameter values included therewith and corresponding to device 304c to the appropriate network configuration parameters of device 304c. Accordingly, and optionally device 304c may parse the reply magic packet to determine whether, and if so which, network configuration information included therewith applies to device 304c, again optionally based on matching a unique device identifier included in the reply magic packet to a unique device identifier of the device 304c.

Accordingly, both the request and reply magic packets may include network configuration information stored in association with unique device identifiers, in one embodiment and as described elsewhere herein.

It should be noted that various embodiments described above involve providing appropriate network configuration information to devices in need of network configuration. In some approaches, the network configuration information provided to the devices may be temporary, e.g. in order to allow the device to communicate with a third device and perform permanent/final network configuration.

Similarly, in various approaches the manner in which communications are broadcast and/or replied to may be defined according to the context and/or architecture of the specific network environment in which automatic management network provisioning is implemented. For instance, particular devices may be instructed to reply only to communications received from a particular network, portion of a network, device, etc. as would be understood by a person having ordinary skill in the art upon reading the present descriptions. Such context-specific and/or architecture-specific restrictions/capabilities may be defined by an administrator of the network environment to further configure the scope and performance of automatic management network provisioning in accordance with the presently disclosed inventive concepts.

In all applications of the presently disclosed inventive concepts, whether implemented with or without a management server, the actual configuration of the devices may be securely accomplished with typical digital signing and/or encryption schemes as known in the art.

Similarly, in various embodiments of the general approaches set forth above, the presently disclosed inventive concepts involve emitting a communication such as a "magic packet," but instead of the communication causing devices to enter a full power mode, the communications indicate a device's need for network configuration information. If the network environment includes a second device, server or otherwise, on the network also supporting wake on LAN functionality in the context of address provisioning, the second device may respond to the communication with appropriate network configuration information.

In accordance with various embodiments, advantages of utilizing the presently disclosed inventive concepts for management of network provisioning include: avoiding the use of DHCP and associated security risks; obviating the need for administrator interaction in the provisioning process, e.g. by recording MAC addresses of configured devices via manual entry into a static DHCP table; achieving automatic provisioning of network configuration programmatically (which in turn enables assigning configuration information automatically in a multitude of ways that may be defined or chosen by the administrator, e.g. at initialization of the network environment); and utilizing existing standards and/or formats for network communication (such as a magic packet) in a manner that does not adversely affect unsupported endpoints, thereby enabling the presently disclosed inventive concepts to be implemented in legacy network environments with broad applicability and without requiring the installation of new code or modification of the network environment or devices connected thereto to accomplish provisioning as described herein.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
broadcasting a provisioning request to one or more devices of a network environment;
receiving at least one provisioning reply from at least one of the one or more devices; and
broadcasting a provisioning configuration packet to at least the device(s) from which the at least one provisioning reply was received,
wherein the provisioning request comprises an instruction configured to cause each of the one or more devices of the network environment exhibiting a default network configuration parameter to broadcast one of the provisioning replies.

2. The computer-implemented method as recited in claim 1, wherein the provisioning request comprises identifying information corresponding to a network provisioning management server of the network environment.

3. The computer-implemented method as recited in claim 1, wherein the default network configuration parameter comprises a default IP address.

4. The computer-implemented method as recited in claim 1, wherein each provisioning reply comprises:
an indication that the device from which the provisioning reply was received exhibits a default network configuration parameter; and
identifying information corresponding to the device exhibiting the default network configuration parameter.

5. The computer-implemented method as recited in claim 4, wherein the default network configuration parameter comprises a default IP address; and
wherein the identifying information uniquely identifies the device exhibiting the default IP address within the network environment.

6. The computer-implemented method as recited in claim 1, wherein the provisioning configuration packet comprises:
at least one unique value of a network configuration parameter.

7. The computer-implemented method as recited in claim 6, wherein the network configuration parameter comprises an IP address; and
wherein each different one of the unique values is assigned to a different one of the devices from which the provisioning replies were received; and
wherein the unique values are assigned based on information identifying each different one of the devices from which the provisioning replies were received.

8. The computer-implemented method as recited in claim 7, comprising:
verifying some or all of the unique values assigned to the different devices.

9. The computer-implemented method as recited in claim 7, wherein the information identifying each different one of the devices from which the provisioning replies were received is individually selected from the group consisting of: a device serial number; a device type; and a device MAC address.

10. The computer-implemented method as recited in claim 1, wherein the broadcasting the provisioning configuration packet to the device from which the provisioning reply was received is performed automatically in response to receiving the provisioning reply from the device.

11. The computer-implemented method as recited in claim 1, wherein one or more of the provisioning request, the at least one provisioning reply, and the provisioning configuration packet comprises a magic packet style header.

12. An automatic management network provisioning system comprising a management server including a processor and logic integrated with and/or executable by the processor to cause the management server to perform the computer-implemented method as recited in claim 1; and wherein each of the broadcasting the provisioning request, the receiving the at least one provisioning reply, and the broadcasting the provisioning configuration packet are performed by the management server.

13. A computer program product comprising a non-transitory computer readable medium having stored thereon computer readable program instructions executable by an automatic management network provisioning server to cause the server to perform a method comprising:
broadcasting a provisioning request to one or more devices of a network environment;
receiving at least one provisioning reply from at least one of the one or more devices; and
broadcasting a provisioning configuration packet to each device from which one of the provisioning replies was received,
wherein the provisioning request comprises an instruction configured to cause each of the one or more devices of the network environment exhibiting a default network configuration parameter to broadcast one of the provisioning replies.

14. A computer-implemented method, comprising:
broadcasting a provisioning request to one or more devices of a network environment;
receiving at least one provisioning reply from at least one of the one or more devices; and
broadcasting a provisioning configuration packet to at least the device(s) from which the at least one provisioning reply was received,
wherein each provisioning reply comprises:
an indication that the device from which the provisioning reply was received exhibits a default network configuration parameter, and
identifying information corresponding to the device exhibiting the default network configuration parameter.

15. The computer-implemented method as recited in claim 14, wherein the provisioning request comprises identifying information corresponding to a network provisioning management server of the network environment.

16. The computer-implemented method as recited in claim 14, wherein the provisioning request comprises an instruction configured to cause each of the one or more devices of the network environment exhibiting a default network configuration parameter to broadcast one of the provisioning replies.

17. The computer-implemented method as recited in claim 16, wherein the default network configuration parameter comprises a default IP address.

18. The computer-implemented method as recited in claim 14, wherein the default network configuration parameter comprises a default IP address; and
wherein the identifying information uniquely identifies the device exhibiting the default IP address within the network environment.

19. The computer-implemented method as recited in claim 14, wherein the provisioning configuration packet comprises:
at least one unique value of a network configuration parameter.

20. The computer-implemented method as recited in claim 19, wherein the network configuration parameter comprises an IP address; and
wherein each different one of the unique values is assigned to a different one of the devices from which the provisioning replies were received; and
wherein the unique values are assigned based on information identifying each different one of the devices from which the provisioning replies were received.

21. The computer-implemented method as recited in claim 20, comprising: verifying some or all of the unique values assigned to the different devices.

22. The computer-implemented method as recited in claim 14, wherein the broadcasting the provisioning configuration packet to the device from which the provisioning reply was received is performed automatically in response to receiving the provisioning reply from the device.

23. The computer-implemented method as recited in claim 14, wherein one or more of the provisioning request, the at least one provisioning reply, and the provisioning configuration packet comprises a magic packet style header.

24. An automatic management network provisioning system comprising a management server including a processor and logic integrated with and/or executable by the processor to cause the management server to perform the computer-implemented method as recited in claim 14; and
wherein each of the broadcasting the provisioning request, the receiving the at least one provisioning reply, and the broadcasting the provisioning configuration packet are performed by the management server.

25. A computer program product comprising a non-transitory computer readable medium having stored thereon computer readable program instructions executable by an automatic management network provisioning server to cause the server to perform a method comprising:
broadcasting a provisioning request to one or more devices of a network environment;
receiving at least one provisioning reply from at least one of the one or more devices; and
broadcasting a provisioning configuration packet to each device from which one of the provisioning replies was received,
wherein each provisioning reply comprises:
an indication that the device from which the provisioning reply was received exhibits a default network configuration parameter, and
identifying information corresponding to the device exhibiting the default network configuration parameter.

* * * * *